(12) United States Patent
Stanhope et al.

(10) Patent No.: US 7,116,314 B2
(45) Date of Patent: Oct. 3, 2006

(54) METHOD FOR DISTRIBUTION WEAR FOR A TOUCH ENTRY DISPLAY

(75) Inventors: David W. Stanhope, Cary, NC (US); Debra L. Singer-Harter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 10/430,486

(22) Filed: May 6, 2003

(65) Prior Publication Data

US 2004/0222973 A1 Nov. 11, 2004

(51) Int. Cl.
*G09G 5/00* (2006.01)
(52) U.S. Cl. .................................. 345/173; 345/156
(58) Field of Classification Search ................ 345/156, 345/157, 158, 173, 174, 175, 179, 168, 169, 345/176, 178, 162, 172; 178/18.01, 18.06, 178/19.05, 18.1; 715/750, 764, 773, 835, 715/866, 840
See application file for complete search history.

(56) References Cited

U.S. PATENT DOCUMENTS

| | | | |
|---|---|---|---|
| 5,592,198 A | 1/1997 | Fagard et al. | 345/173 |
| 5,627,567 A * | 5/1997 | Davidson | 345/173 |
| 5,933,257 A * | 8/1999 | Kurita | 358/527 |
| 5,936,614 A * | 8/1999 | An et al. | 345/173 |
| 5,956,020 A * | 9/1999 | D'Amico et al. | 345/173 |
| 5,969,706 A * | 10/1999 | Tanimoto et al. | 345/671 |
| 6,400,376 B1 * | 6/2002 | Singh et al. | 345/685 |
| 6,417,846 B1 | 7/2002 | Lee | 345/173 |
| 6,456,952 B1 | 9/2002 | Nathan | 702/94 |
| 6,466,203 B1 * | 10/2002 | Van Ee | 345/173 |
| 6,831,631 B1 * | 12/2004 | Chuang | 345/173 |
| 2002/0067346 A1 | 6/2002 | Mouton | 345/173 |
| 2002/0163507 A1 * | 11/2002 | Kao | 345/173 |
| 2003/0112225 A1 * | 6/2003 | Granberg | 345/173 |
| 2003/0222858 A1 * | 12/2003 | Kobayashi | 345/173 |
| 2005/0030291 A1 * | 2/2005 | Yanagisawa | 345/173 |

* cited by examiner

*Primary Examiner*—Nitin Patel
(74) *Attorney, Agent, or Firm*—Sawyer Law Group LLP

(57) ABSTRACT

A method for distribution of wear for a touch display, includes: providing at least one graphic at a first location on a touch display, where the display includes at least one target area corresponding to the graphic; registering a first touch within the target area; and moving the graphic to a second location on the touch display, where the target area moves in accordance with its corresponding graphic. By moving the target area in this manner, the wear of the touch display is distributed to avoid accelerated wear of particular target areas due to repeated use.

16 Claims, 9 Drawing Sheets

METHOD FOR DISTRIBUTION WEAR FOR A TOUCH ENTRY DISPLAY

FIELD OF THE INVENTION

The present invention relates to touch input technology, and more particularly to the target areas on displays of devices using input touch technology.

BACKGROUND OF THE INVENTION

Touch input technology is well known in the art. Touch input technology has been used as a computer interface in many different applications, including personal digital assistants (PDA), mobile phones, and computers for commercial transactions.

FIG. 1 illustrates an example touch interface. The computer 100, such as PDA, comprises a touch display 102, such as a resistive touch display, within which are displayed a plurality of graphics. For example, graphics for a calculator is demonstrated. Each graphic, such as the graphic 104 for the number "6", has a corresponding target area 106. When a user touches a finger, pen, or some other object within the target area 106, the selection of the graphic 104 is registered by the computer 100. The same is true for the other graphics whose target areas may be touched by the user.

However, a target area 106 can become less responsive and/or much less transparent due to wear from repeated touches. This is especially true when objects other than a human finger are used to touch the target area 106, and when the same target area 106 is repeatedly touched. When such wear occurs, the interface becomes less effective.

Accordingly, there exists a need for a method for distribution of wear for a touch display. The method should be easy to implement and reduce the rate of wear of target areas on a touch display. The present invention addresses such a need.

SUMMARY OF THE INVENTION

A method for distribution of wear for a touch display, includes: providing at least one graphic at a first location on a touch display, where the display includes at least one target area corresponding to the graphic; registering a first touch within the target area; and moving the graphic to a second location on the touch display, where the target area moves in accordance with its corresponding graphic. By moving the target area in this manner, the wear of the touch display is distributed to avoid accelerated wear of particular target areas due to repeated use.

DETAILED DESCRIPTION

The present invention provides a method for distribution of wear for a touch display. The present invention would benefit any touch input technology, but is particularly effective in extending the life of resistive touch displays because the touch display surface is plastic.

The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 5B in conjunction with the discussion below.

Figure 1:
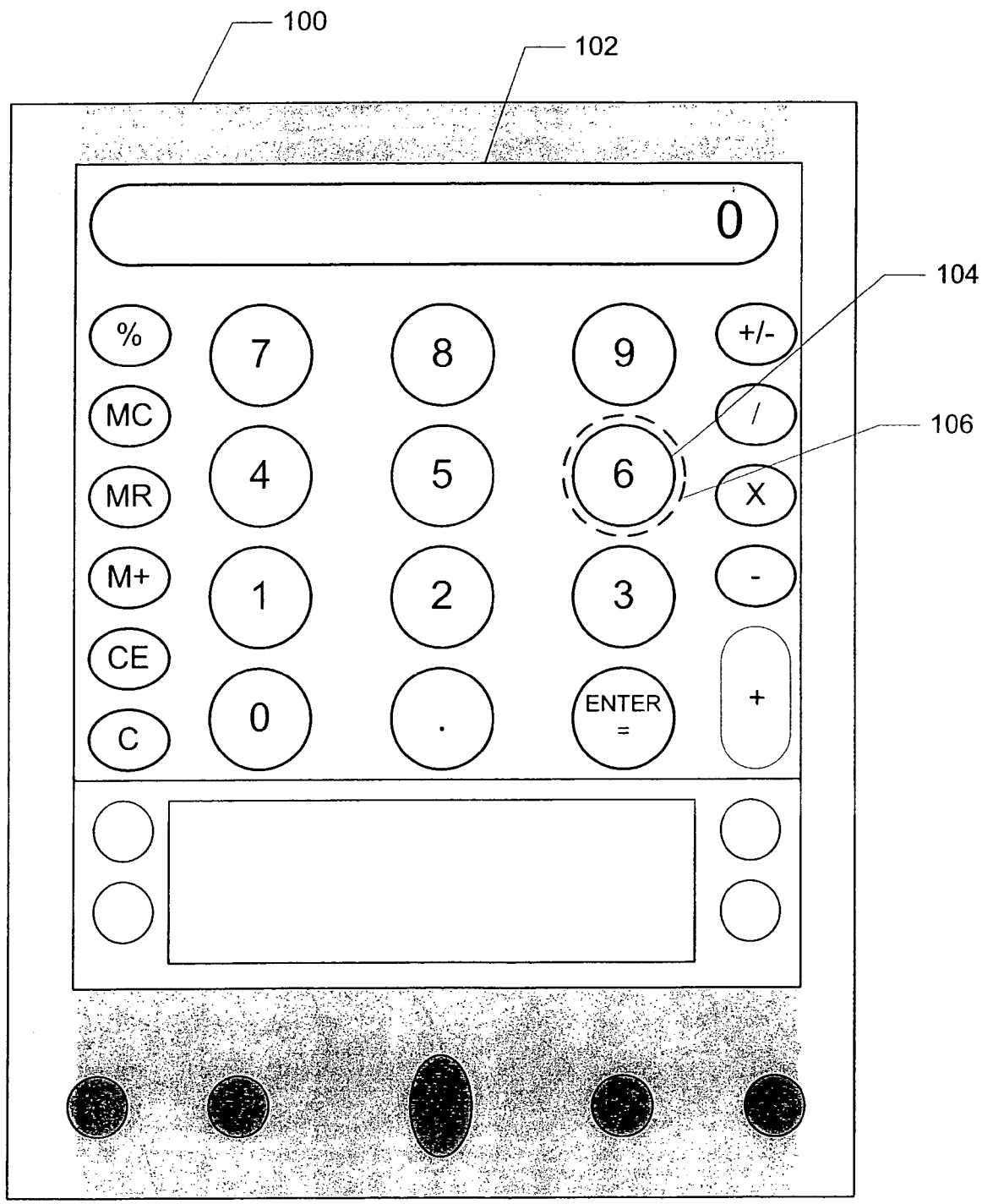
FIG. 1 illustrates an example touch interface.
Figure 2:
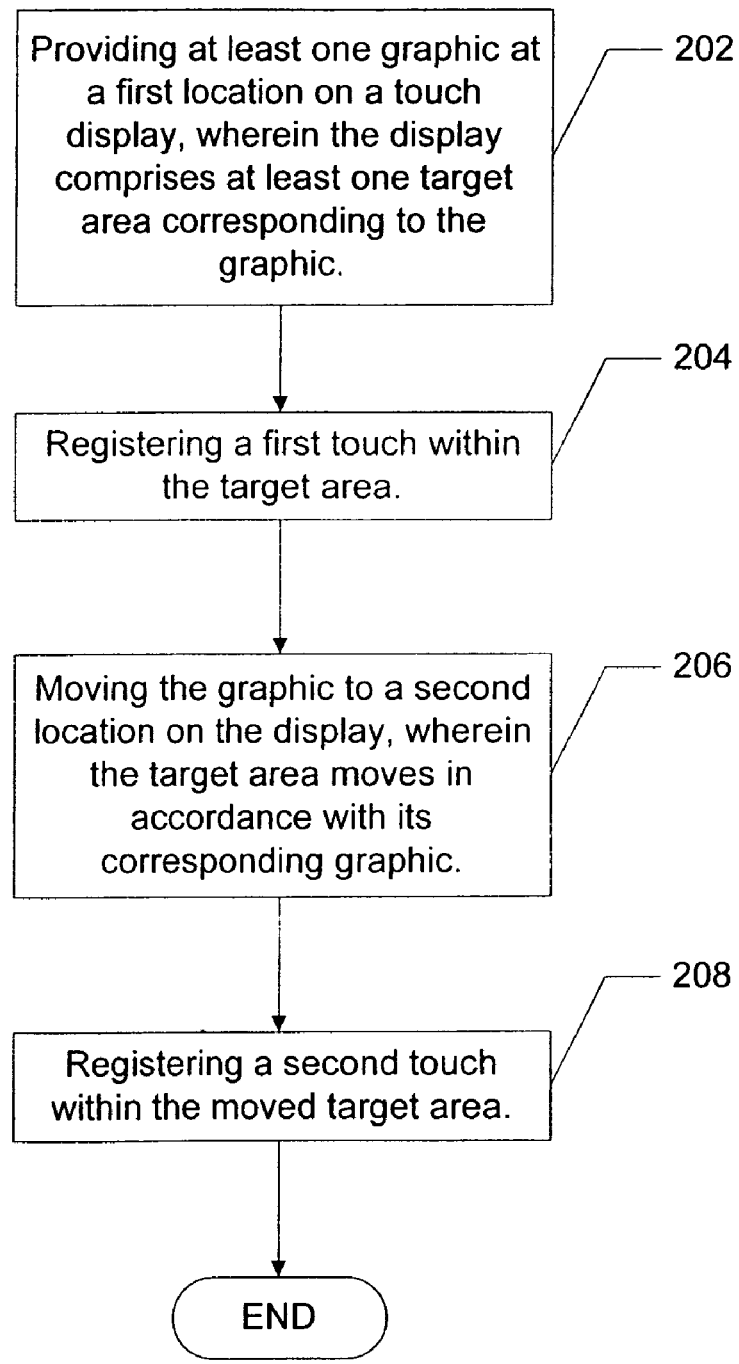
FIG. 2 is a flowchart illustrating a preferred embodiment of a method for distribution of wear for a touch display in accordance with the present invention.

FIG. 2 is a flowchart illustrating a method for distribution of wear for a touch display in accordance with the present invention. First, at least one graphic is provided at a first location on a touch display, via step 202, wherein the display comprises at least one target area corresponding to the graphic. Next, a first touch is registered within the target area, via step 204. Then, the graphic is moved to a second location on the display, via step 206, wherein the target area moves in accordance with its corresponding graphic. In other words, as the graphic moves, its target area moves with it. Next, a second touch is registered within the moved target area, via step 208. By moving the graphic and its corresponding target area between touches, the location of the target area on the display is distributed, thus reducing the rate of wear of a particular location on the display.

Figure 3:
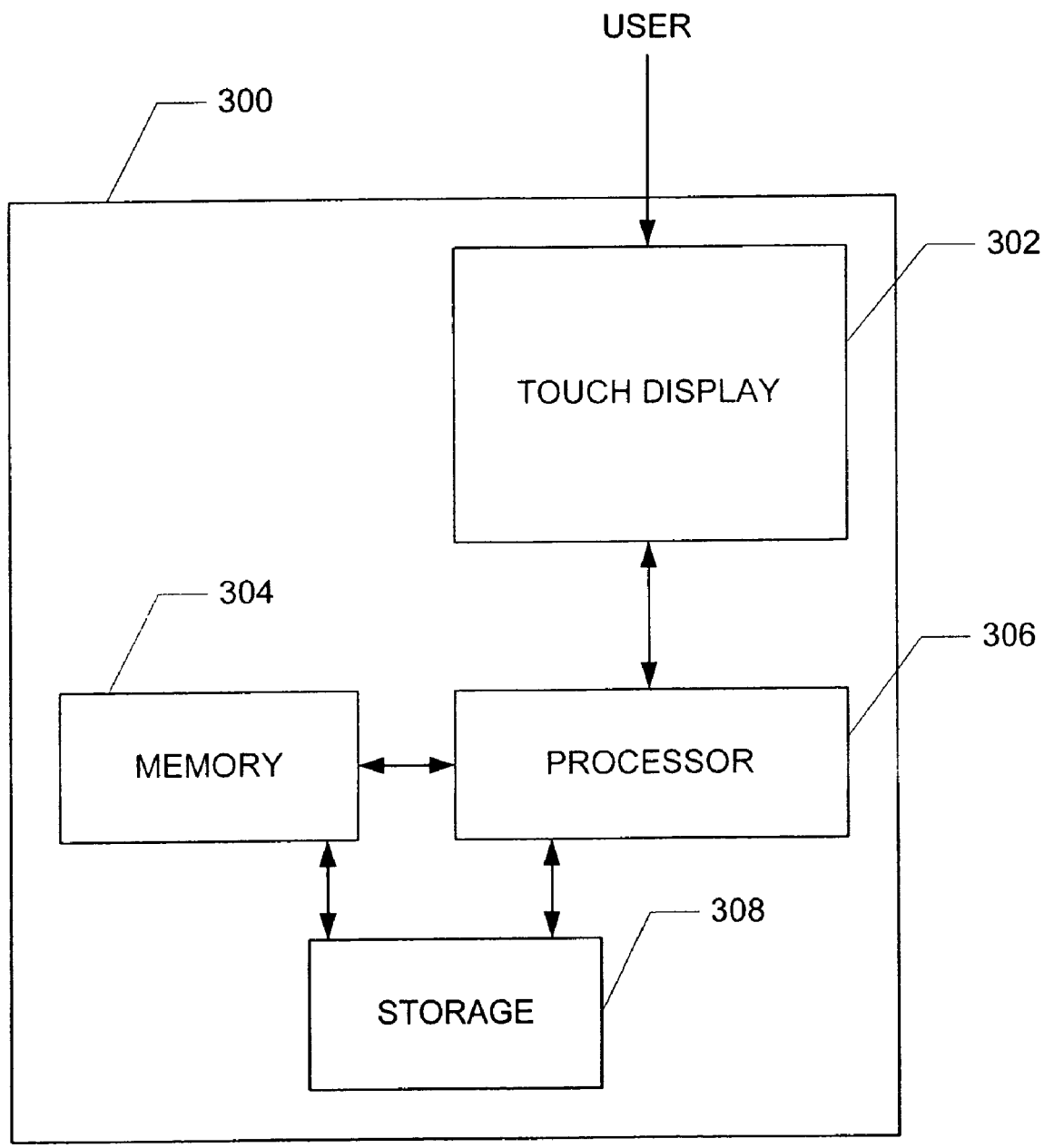
FIG. 3 illustrates an example computer system which implements the method for distribution of wear for a touch display in accordance with the present invention.

FIG. 3 illustrates an example computer system which implements the method for distribution of wear for a touch display in accordance with the present invention. The computer system 300 comprises a touch display 302, memory 304, a processor 306, and a storage medium 308. Software for implementing the method can be stored on the storage medium 308. The processor 306, utilizing the memory 304, executes the software. The computer system 300 interfaces with the touch display 302, providing graphics to be displayed and defining their corresponding target areas. A user interacts with the touch display 302 by touching the various target areas, which is then processed by the processor 304.

Figure 4A:
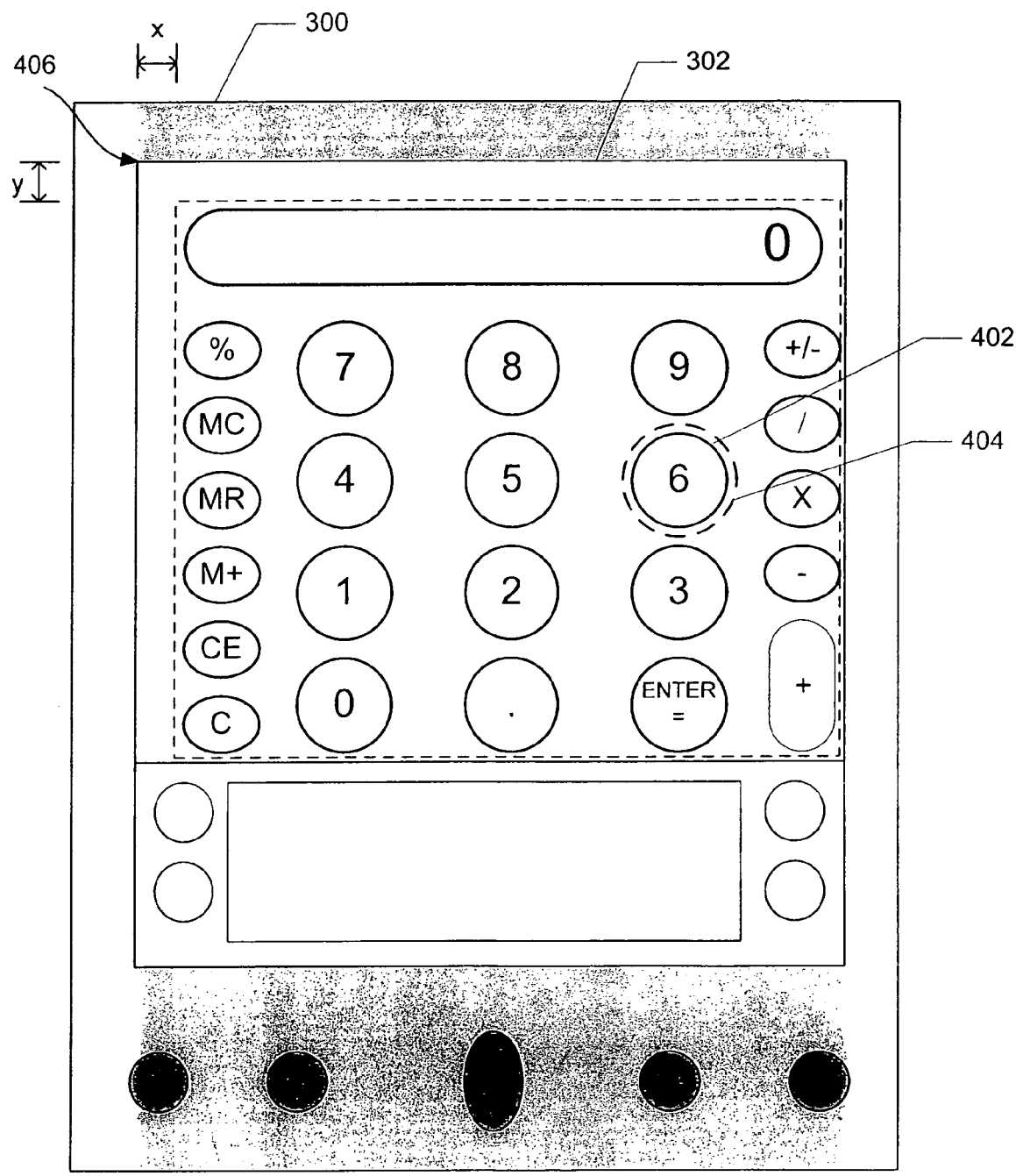
FIGS. 4A–4D illustrate a first example embodiment of the method for distribution of wear for a touch display in accordance with the present invention.

FIGS. 4A–4D illustrate a first example embodiment of the method for distribution of wear for a touch display in accordance with the present invention. In the first example embodiment, the touch display is a resistive touch display, and the totality of the graphics in the resistive touch display are moved between sessions. A session, as used in this specification, could be a single touch, a defined sequence of touches, or a single user or operation, such as a calculation. As illustrated in FIG. 4A, the totality of the graphics in the display 302 of the computer 300 is placed at an offset distance, (x, y), from a corner 406 of the display 302. For the calculator example, a graphic 402 for the number "6" is displayed at a first location on the display 302, via step 202. The graphic 402 has a corresponding target area 404. Assume that a user touches the display 302 within the target area 402. The computer 300 registers this first touch within the target area 404, via step 204.

Figure 4B:
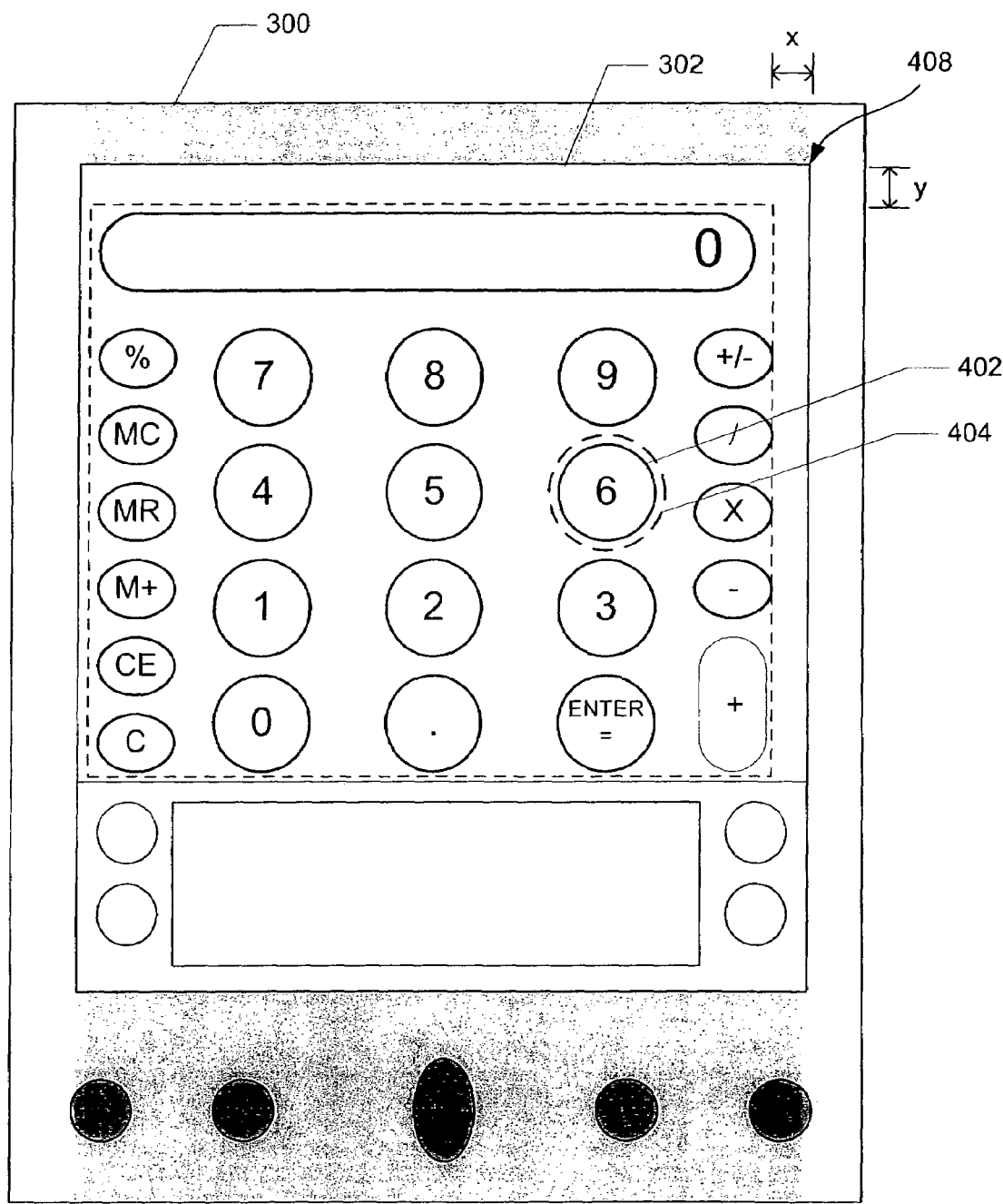

Then, the computer 100 moves the graphic 402 to a second location on the display 302, via step 206. For example, as illustrated in FIG. 4B, the totality of the graphics in the display 302 is moved so that it is offset a distance (x, y) from a different corner 408 of the display 302. When the graphic 402 is thus moved to the second location, its corresponding target area 404 is also moved. When the user then touches the display 302 within the moved target area 402, the computer 100 registers this second touch, via step 208.

Figure 4C:
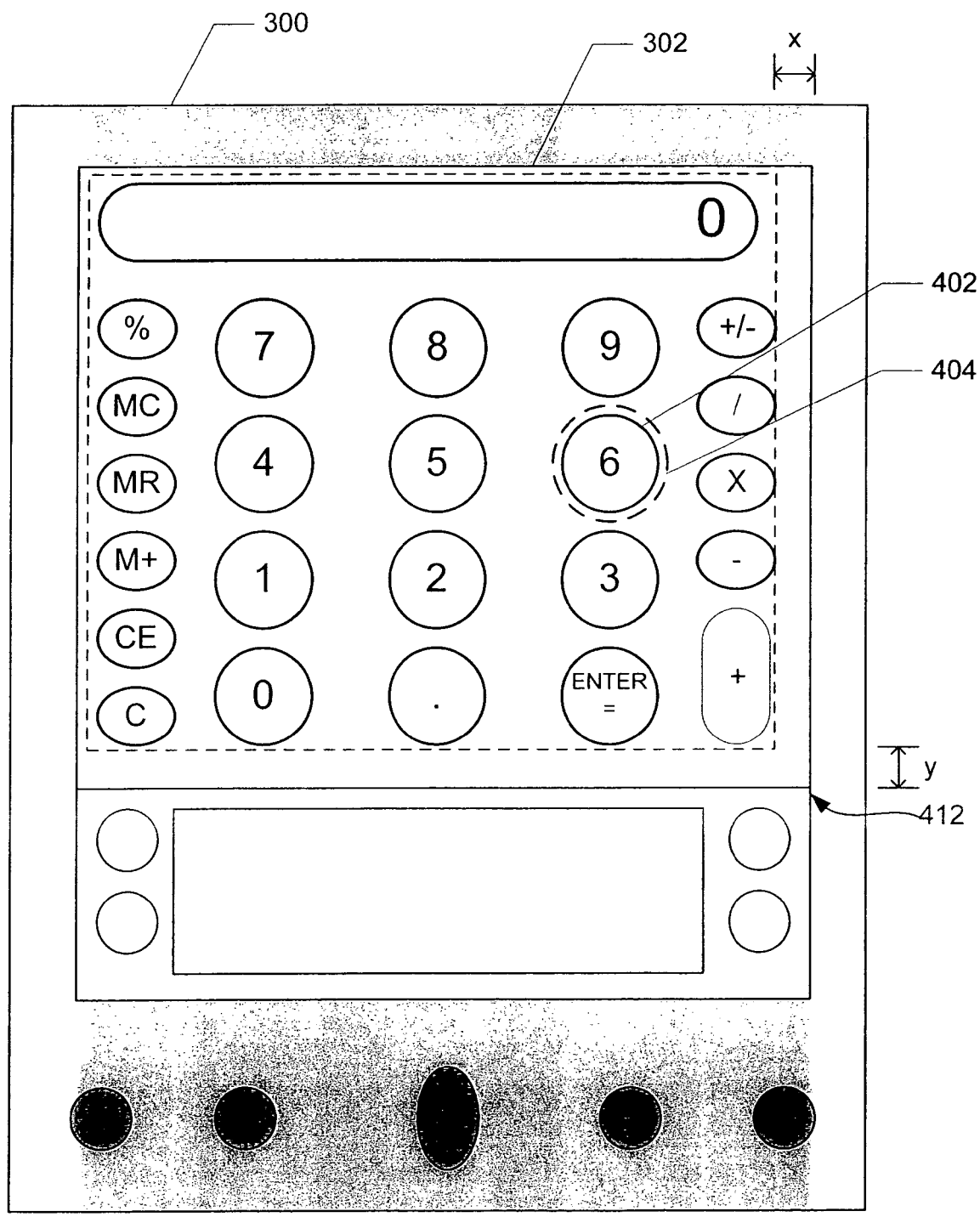

Similarly, after this second touch, as illustrated in FIG. 4C, the totality of the graphics in the display 302 can be moved again so that it is offset a distance (x, y) from a third corner 412 of the display 302. When the graphic 402 is thus moved to this third location, its corresponding target area 404 is also moved. The user can then touch the display 302 within this moved target area 402.

Figure 4D:
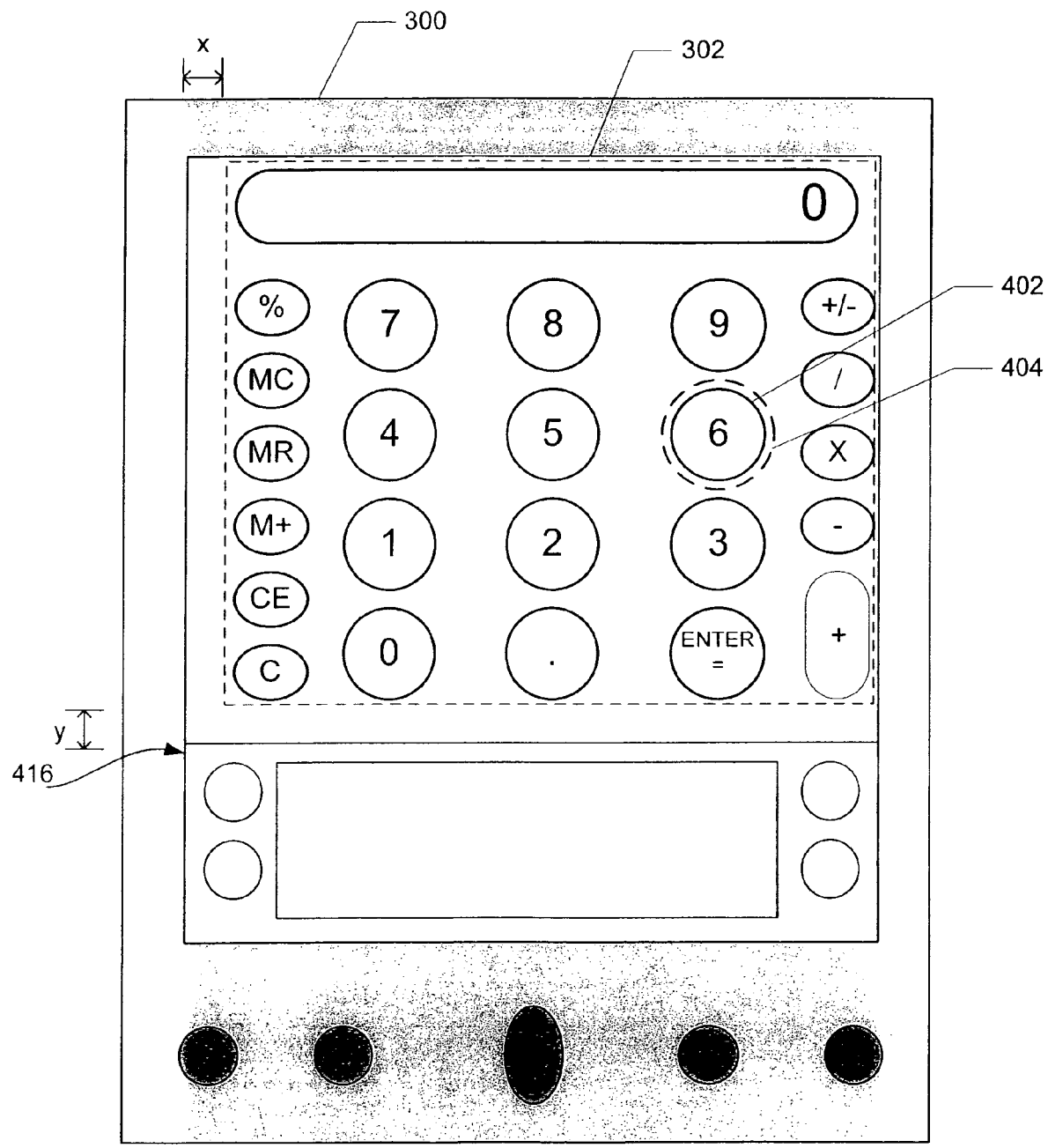

Similarly, after the third touch, as illustrated in FIG. 4D, the totality of the graphics in the display 302 can be moved again so that it is offset a distance (x, y) from a fourth corner 416 of the display 302. When the graphic 402 is thus moved to this fourth location, its corresponding target area 404 is also moved. The user can then touch the display 302 within this moved target area 404.

The totality of the graphics in the display 302 can be continuously moved in this fashion, thus distributing the location of the target area. This in turn reduces the rate of wear of particular locations on the display.

Although the first embodiment offsets the graphics from corners of the display 302, one of ordinary skill in the art will understand that other ways of moving the graphics between sessions may be used without departing from the spirit and scope of the present invention. For example, the totality of the graphics may be offset from the top, bottom, or side edges of the display 302 between touches and after a specified idle time.

Figure 5A:
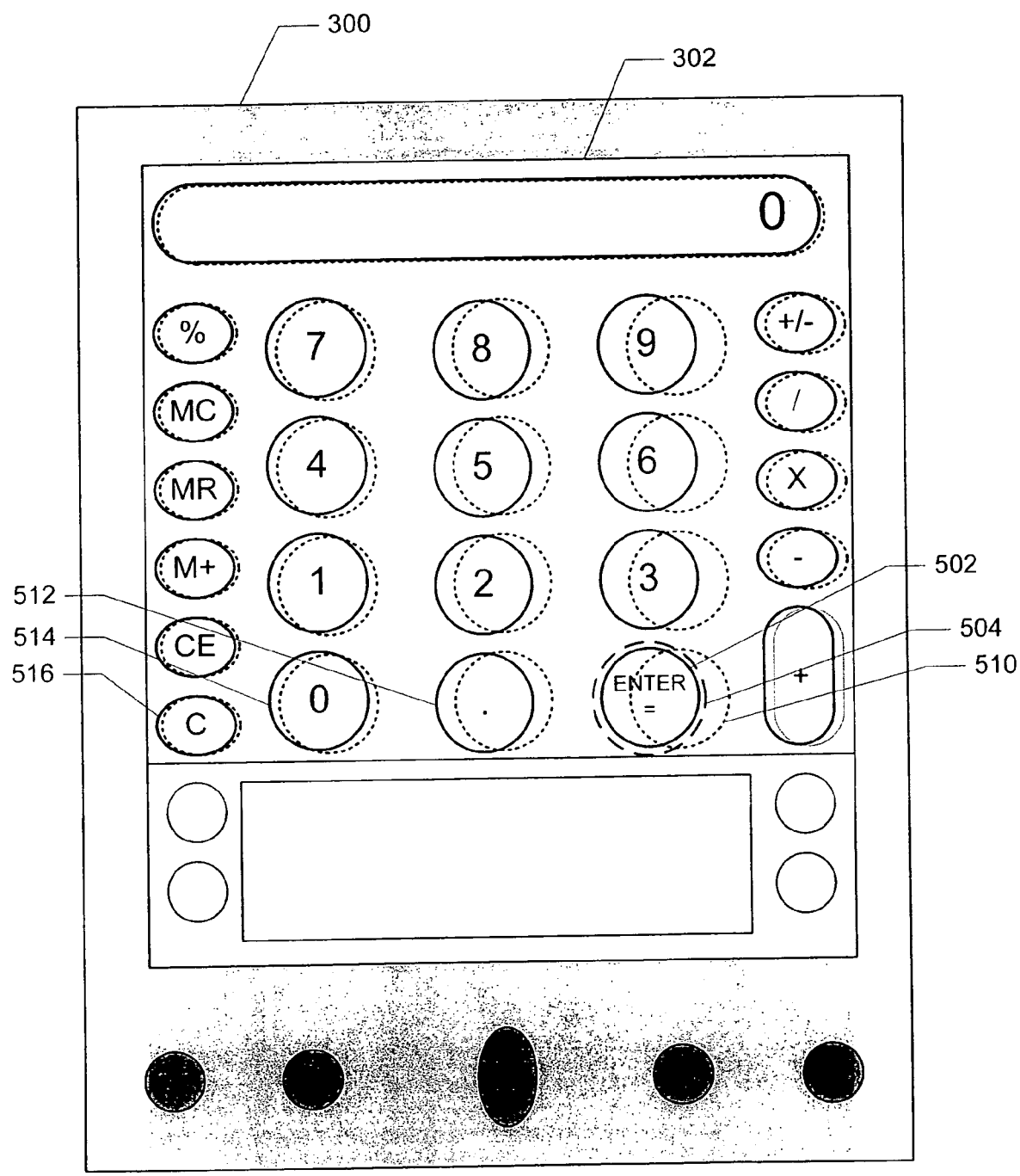
FIGS. 5A–5B illustrate a second example embodiment of the method for distribution of wear for a touch display in accordance with the present invention.
Figure 5B:
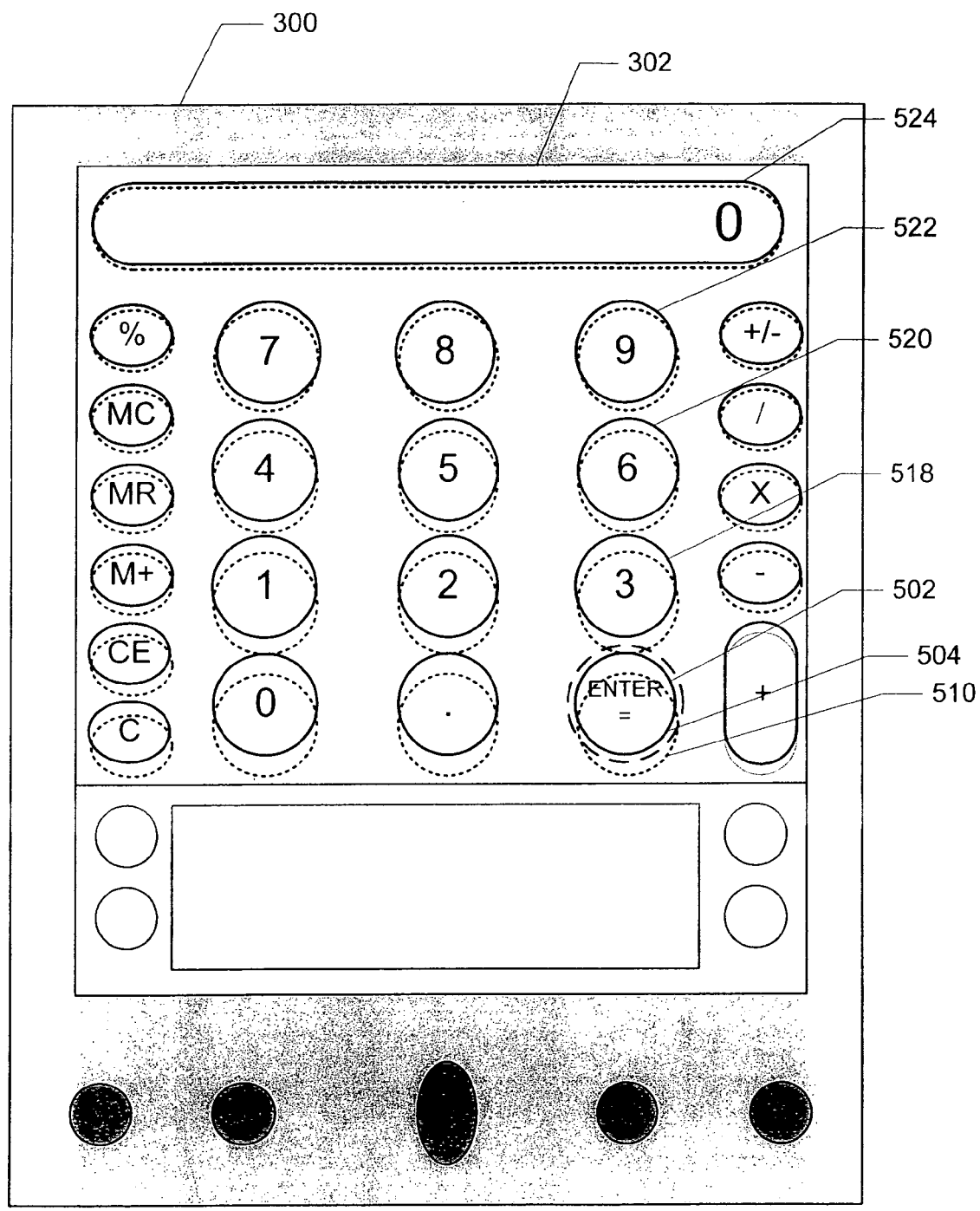

FIGS. 5A–5B illustrate a second example embodiment of the method for distribution of wear for a touch display in accordance with the present invention. In the second example embodiment, the graphic or graphics is moved by "stretching" the location offsets of the graphic(s) surrounding the target area(s). "Stretching", as used in this specification, refers to either the expansion or contraction of location offsets for graphics on the display in relation to the other graphics. This allows a target area to be moved while also utilizing the full area of the display 302.

As illustrated in FIG. 5A, the "Enter=" graphic 502 is the most frequently used input for this calculator example. The dotted lines illustrate the positions of the graphics as displayed without the present invention. The solid lines illustrate the positions of the graphics as displayed with the present invention. The dashed line 504 illustrates the target area corresponding to the graphic 502. First, the graphic 502 is provided on the display 302, via step 202. The graphic 502 is offset to the left of its position 510 without the present invention. The location offsets of the graphics to the right of the graphic 502 are expanded, and the location offsets of the graphics to the left are contracted. In this example, the position of the graphic 502 is offset the most, while the graphic 512 for "." is offset less, and the graphic 514 for "0" is offset even less. The graphic 516 for "C", which is the nearest to the left edge of the display 302, is offset the least. In the second embodiment, the offsets of the location graphics 502, 512, 514, and 516 vary linearly. Alternatively, non-linear variations may be used. When the user touches the display 302 within the target area 504, the computer 300 registers this first touch, via step 204.

A subsequent session is illustrated in FIG. 5B. The graphic 502 is moved, via step 206, so that it is offset to the top of its position 510 without the present invention. The location offsets of the graphics to the top of the graphic 502 are contracted. For this session, the position of the graphic 502 is offset the most, while the graphic 518 for "3" is offset less, the graphic 520 for "6" is offset even less, and the graphic 522 for "9" is offset even less still. The graphic 524, which is the nearest to the top edge of the display 302, is offset the least. When the user touches the display 302 within the moved target area 504, the computer 300 registers this second touch, via step 208.

Similarly, the graphic 502 can be subsequently moved so that it is offset to the right (not shown), with the location offsets of the graphics to the left of the graphic 502 expanded, and the location offsets of the graphics to the right of the graphic 502 contracted. In this manner, the location of the target area 504 on the display 302 is distributed, reducing the rate of wear of this particular location on the display 302, while utilizing the full area of the display 302.

Although the present invention is described above with the example embodiments, one of ordinary skill in the art will understand that other embodiments are possible without departing from the spirit and scope of the present invention. Although the example embodiments are described in the context of resistive touch displays, one of ordinary skill in the art will understand that the present invention can be applied to other types of touch displays without departing from the spirit and scope of the present invention. For example, the present invention can also be applied to IR, SAW, capacitive, camera, or electrostatic touch displays.

A method for distribution of wear for a touch display has been disclosed. In this method, a graphic is provided at a first location on a touch display, where the display comprises a target area corresponding to the graphic. After a first touch within the target area is registered, then the graphic is moved to a second location on the display, where the target area moves in accordance with its corresponding graphic. A second touch within the moved target area can then be registered. In this manner, the wear of the touch display is distributed to avoid accelerated wear of particular target areas due to repeated use.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for distribution of wear for a touch display, comprising:
   (a) providing at least one graphic at a first location on a touch display, wherein the display comprises at least one target area corresponding to the graphic, wherein the providing step (a) comprises:
       (a1) providing the graphic at the first location on the touch display, wherein the first location is offset by a first predetermined distance from a first edge of the touch display, wherein the touch display comprises the target area corresponding to the graphic;
   (b) registering a first touch within the target area;
   (c) moving the graphic to a second location on the touch display, wherein the target area moves in accordance with its corresponding graphic; and
   (d) registering a second touch within the moved target area.

2. The method of claim 1, wherein the moving step (c) comprises:

(c1) moving the graphic to the second location on the touch display, wherein the second location is offset by a second predetermined distance from a second edge of the touch display, wherein the target area moves in accordance with its corresponding graphic.

3. The method of claim 1, wherein the providing step (a) comprises:
   (a1) providing the graphic at the first location on the touch display, wherein location offsets of graphics proximate to the graphic at the first location are stretched, wherein the touch display comprises the target area corresponding to the graphic.

4. The method of claim 3, wherein the moving step (c) comprises:
   (c1) moving the graphic to the second location on the touch display, wherein the location offsets of the graphics proximate to the graphic at the second location are stretched, wherein the target area is moved in accordance with the graphic at the second location.

5. The method of claim 4, wherein the location offsets of the graphics proximate to the graphic at the first or second locations vary linearly such that any graphic nearest an edge of the display is offset a least amount.

6. A method for distribution of wear for a touch display, comprising the steps of:
   (a) providing a graphic at a first location on the touch display, wherein the first location is offset by a first predetermined distance from a first edge of the touch display, wherein the touch display comprises a target area corresponding to the graphic;
   (b) registering a first touch within the target area; and
   (c) moving the graphic to a second location on the touch display, wherein the second location is offset by a second predetermined distance from a second edge of the touch display, wherein the target area moves in accordance with its corresponding graphic.

7. A method for distribution of wear for a touch display, comprising the steps of:
   (a) providing a graphic at a first location on the touch display, wherein location offsets of graphics proximate to the graphic at the first location are stretched, wherein the touch display comprises a target area corresponding to the graphic;
   (b) registering a first touch within the target area; and
   (c) moving the graphic to a second location on the touch display, wherein the location offsets of the graphics proximate to the graphic at the second location are stretched, wherein the target area is moved in accordance with the graphic at the second location.

8. The method of claim 7, wherein the location offsets of the graphics proximate to the graphic at the first or second locations vary linearly such that any graphic nearest an edge of the display is offset a least amount.

9. A computer readable medium with program instructions for distribution of wear for a touch display, comprising the instructions for:
   (a) providing at least one graphic at a first location on a touch display, wherein the display comprises at least one target area corresponding to the graphic, wherein the providing instruction (a) comprises instructions for:
      (a1) providing the graphic at the first location on the touch display, wherein the first location is offset by a first predetermined distance from a first edge of the touch display, wherein the touch display comprises the target area corresponding to the graphic;
   (b) registering a first touch within the target area;
   (c) moving the graphic to a second location on the touch display, wherein the target area moves in accordance with its corresponding graphic; and
   (d) registering a second touch within the moved target area.

10. The medium of claim 9, wherein the moving instruction (c) comprises instructions for:
    (c1) moving the graphic to the second location on the touch display, wherein the second location is offset by a second predetermined distance from a second edge of the touch display, wherein the target area moves in accordance with its corresponding graphic.

11. The medium of claim 9, wherein the providing instruction (a) comprises instructions for:
    (a1) providing the graphic at the first location on the touch display, wherein location offsets of graphics proximate to the graphic at the first location are stretched, wherein the touch display comprises the target area corresponding to the graphic.

12. The medium of claim 11, wherein the moving instruction (c) comprises instructions for:
    (c1) moving the graphic to the second location on the touch display, wherein the location offsets of the graphics proximate to the graphic at the second location are stretched, wherein a size of the target area is changed in accordance with the graphic at the second location.

13. The medium of claim 12, wherein the location offsets of the graphics proximate to the graphic at the first or second locations vary linearly such that any graphic nearest an edge of the display is offset a least amount.

14. A computer readable medium with program instructions for distribution of wear for a touch display, comprising the instruction for:
    (a) providing a graphic at a first location on the touch display, wherein the first location is offset by a first predetermined distance from a first edge of the touch display, wherein the touch display comprises a target area corresponding to the graphic;
    (b) registering a first touch within the target area; and
    (c) moving the graphic to a second location on the touch display, wherein the second location is offset by a second predetermined distance, from a second edge of the touch display, wherein the target area moves in accordance with its corresponding graphic.

15. A computer readable medium with program instructions for distribution of wear for a touch display, comprising the instructions for:
    (a) providing a graphic at a first location on the touch display, wherein location offsets of graphics proximate to the graphic at the first location are stretched, wherein the touch display comprises a target area corresponding to the graphic;
    (b) registering a first touch within the target area; and
    (c) moving the graphic to a second location on the touch display, wherein the location offsets of the graphics proximate to the graphic at the second location are stretched, wherein a size of the target area is changed in accordance with the graphic at the second location.

16. The medium of claim 15, wherein the location offsets of the graphics proximate to the graphic at the first or second locations vary linearly such that any graphic nearest an edge of the display is offset a least amount.

* * * * *